Jack D. Layton
INVENTOR.

BY Ramsey, Kolisch + Hartwell
Attys.

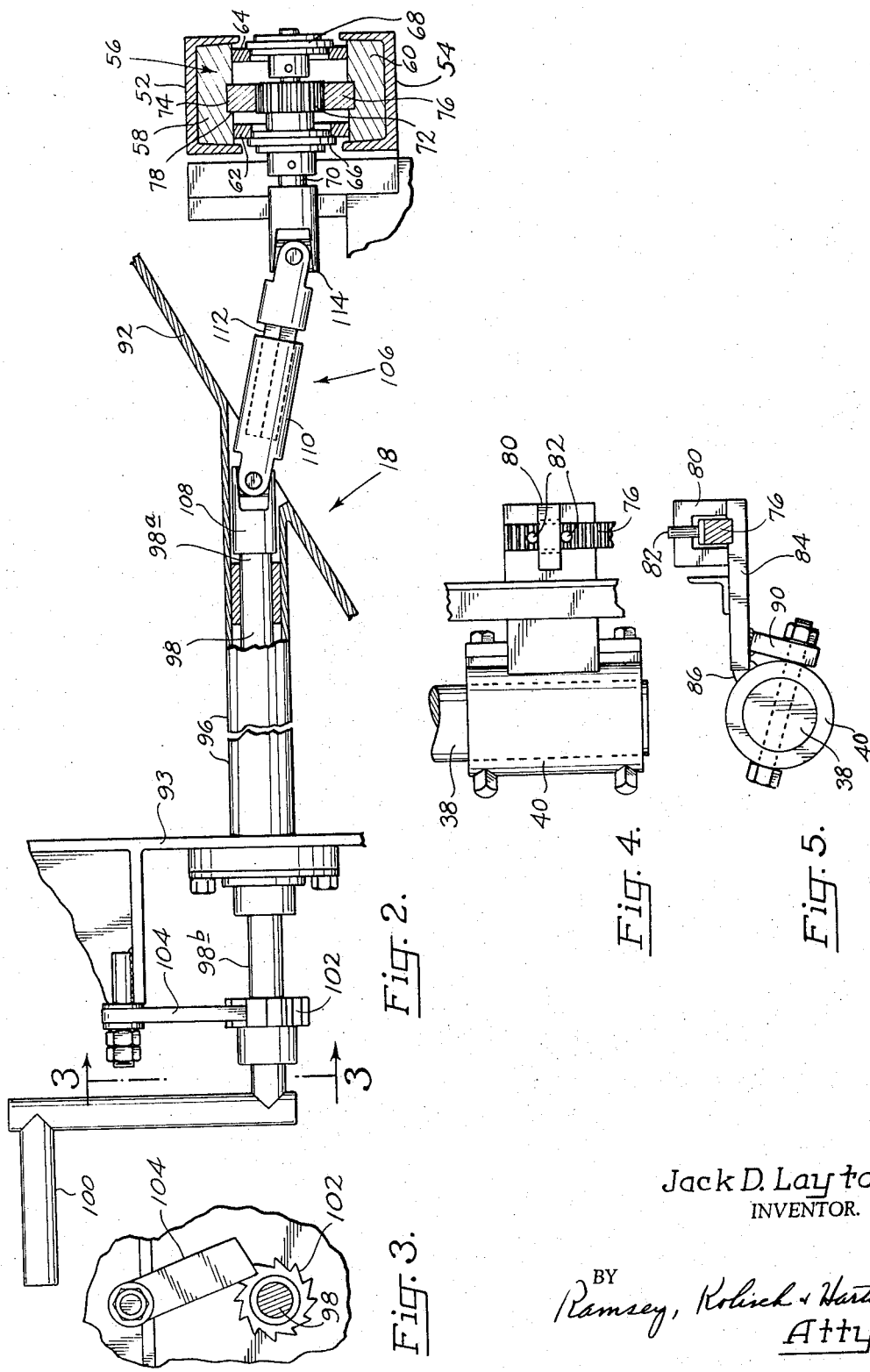

United States Patent Office 3,300,234
Patented Jan. 24, 1967

3,300,234
APPARATUS FOR ATTACHING TRAILING AND LEAD VEHICLES
Jack D. Layton, Salem, Oreg., assignor to Layton Manufacturing Co., Salem, Oreg., a corporation of Oregon
Filed Aug. 4, 1964, Ser. No. 387,298
6 Claims. (Cl. 280—460)

This invention concerns apparatus for coupling trailing and lead vehicles together, and more particularly concerns mechanism of this description which includes a pair of oppositely disposed attaching arms carried by the trailing vehicle that come together to engage rear wheel assemblies in a lead vehicle to produce a connection between the vehicles.

In a specific and preferred embodiment of the invention, the apparatus contemplated may connect a paver or similar machine with a dump truck which leads the paver. In such an organization, the apparatus provides a highly satisfactory coupling between the dump truck and paver, which is readily disconnected to enable the substitution of different dump trucks as the lead vehicle.

A paving machine or paver ordinarily may include a hopper into which aggregate is dumped, and a screed or other leveling means which trails the hopper and functions to smooth and compact material flowing from the hopper. During a paving operation, a dump truck traveling in front of the paver dumps aggregate from the dump body thereof into the hopper. When one dump truck becomes empty, it becomes necessary to substitute a filled truck therefor, and thus the requirement for easy detachability of the paver from the dump truck as this must be performed repeatedly during a working day.

A general object of this invention is to provide improved apparatus for coupling a trailing vehicle such as a paver to a lead vehicle such as a dump truck, featuring means mounted on the paver remote from the attaching arms which is actuatable to produce movement of the attaching arms either inwardly to connect the paver and lead vehicle, or outwardly to disconnect the two.

More specifically, an object is to provide such apparatus where the arms may be actuated by an operator stationed at the rear of the hopper in the paver, this being the preferable location of an operator controlling paver operation.

Yet another object of the invention is to provide coupling apparatus which includes mechanism connected to attaching arms for moving them toward or away from each other, a mounting for said mechanism enabling shifting of the mechanism laterally of the paver thus to facilitate making a connection with a lead vehicle, and means for actuating such mechanism mounted on the paver and connected to the mechanism by way of a flexible joint whereby such lateral shifting is accommodated.

A still further object is to provide mechanism for coupling trailing and lead vehicles, including attaching arms as described, manually operated actuator means to be manipulated by a paving machine operator occupying his normal work station at the rear of the hopper, and novel power-transmitting means extending from the actuator and past the hopper to the front of the paver serving to connect the actuator means with mechanism provided at the front of the paver for producing movement in the attaching arms.

These and other objects and advantages are attained by the invention, and the same is described hereinbelow in conjunction with the accompanying drawings, wherein:

FIG. 2 is a view taken generally along the line 2—2 in FIG. 1, drawn on a somewhat larger scale, and with portions broken away, illustrating mechanism connected to the arms which is actuatable to produce movement in the arms, an actuator remote from this mechanism for actuating this mechanism, and means connecting this actuator and the mechanism actuatable to produce arm movement;

FIG. 3 is a cross sectional view taken along the line 3—3 in FIG. 2 illustrating a pawl and ratchet device provided for locking the parts;

FIG. 4 is a view, also drawn on a somewhat larger scale than FIG. 1, taken along the line 4—4 in FIG. 1 and showing structure interconnecting an arm and the mechanism for producing movement in the arms; and FIG. 5 is an end view of the structure illustrated in FIG. 4.

Figure 1:
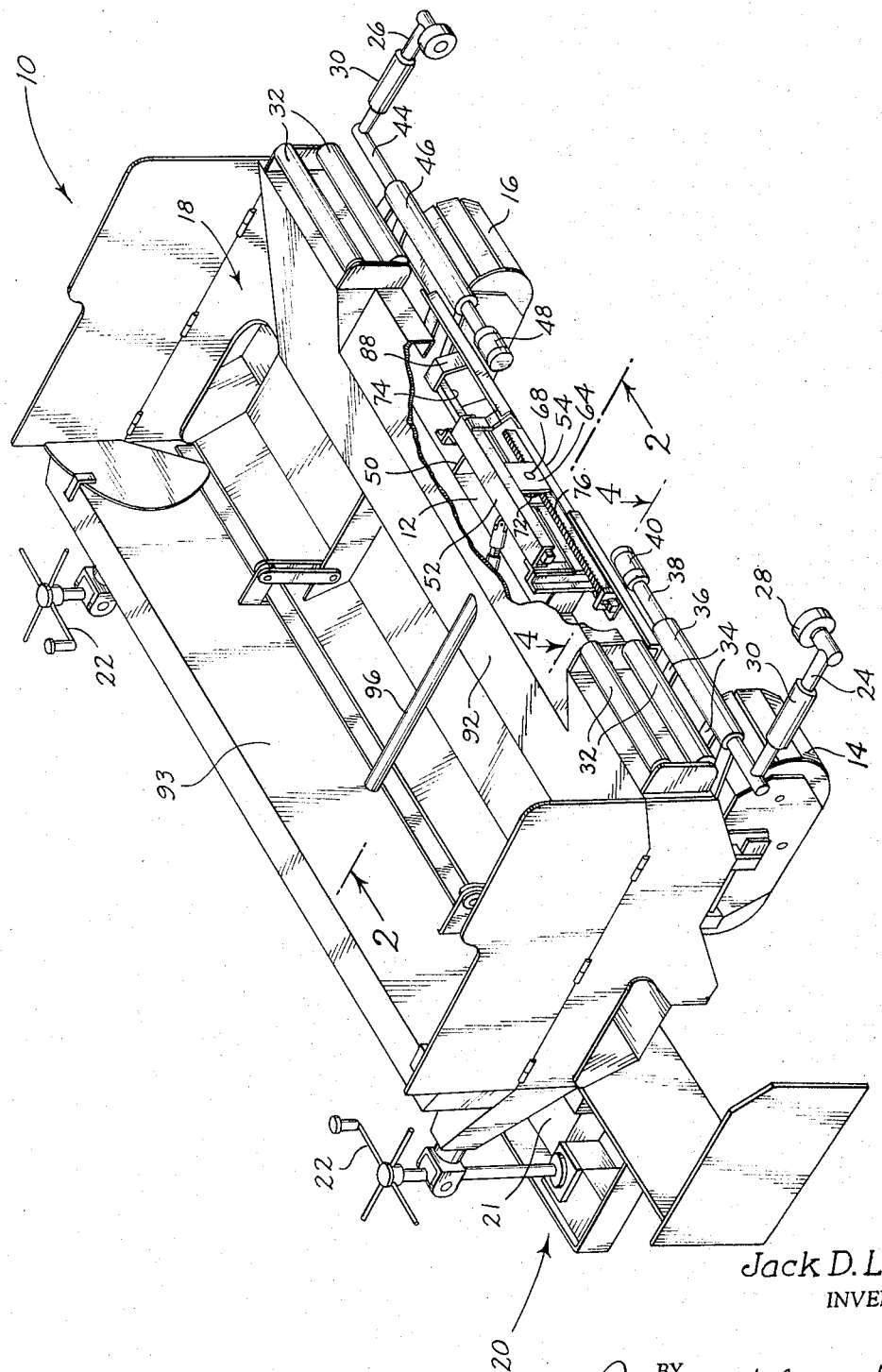
FIG. 1 is a perspective view illustrating a paver constructed according to an embodiment of the invention, with such paver having attaching arms projecting forwardly therefrom for the purpose of coupling the paver to a dump truck through the wheel assemblies of the truck.

Referring now to the drawings, and first of all more particularly to FIG. 1, 10 indicates a paving machine or paver, of a type that may be utilized to spread aggregate over a surface thus to pave the surface. The paver includes the usual frame 12, and mounted on the underside of the frame a pair of endless tracks 14, 16 which support the paving machine for movement over the ground. Mounted on the top of the frame is an elongated transversely extending hopper 18 provided with the usual opening (not shown) along the base thereof through which aggregate travels immediately prior to being spread on the ground.

To the rear of hopper 18 is a vertically adjustable screed or leveling device 20. During paving, the screed smooths and compacts aggregate flowing from the hopper. Adjustments made in the position of the screed relative to the hopper produce changes in the thickness of the pavement produced, and to make these and other adjustments an operator normally is stationed behind the hopper on a platform 21 extending over the top of the screed. Handles for making such an adjustment in the screed are indicated at 22.

The paver illustrated may be towed over the ground by a dump truck which is coupled to the paver through opposed attaching or tow arms 24, 26. These arms project forwardly of the paver, and mount rollers such as those shown at 28 on their forward extremities, which are adapted to ride on the inner annular surfaces of wheel rims normally present in the rear wheel assemblies of a dump truck. Sleeves 30 journaled on the arms between the ends of the arms ride on the sides of outside tire casings in such wheel assemblies, with the arms in a position coupling the paver to a dump truck.

To couple the paver to a dump truck, the arms are moved laterally of the paver and toward each other, to bring sleeves 30 up against the tire casings.

Paver 10 also has rollers 32 journaled on the front thereof, adjacent opposite sides of the paver, for engagement with rear surface portions of the treads of the rear tires of the dump truck. These rollers limit forward movement of the paver relative to the truck wheels, and rollers 28 on the attaching arms limit rear movement of the paver relative to the wheels.

Considering now the mounting for the attaching arms, and first of all arm 24, 34 indicates bracket structure projecting forwardly from the paving machine frame having a sleeve 36 fastened thereto. Arm 24 includes a rod 38 extending through this sleeve and journaled within the sleeve. A fitting 40 secured to the rod adjacent one end limits outward movement of the arm by coming up against the inner end of sleeve 36. Fitting 40 also is connected to mechanism which is actuatable to produce movement of the arm laterally of the vehicle.

In the case of arm 26, the arm includes a rod 44 extending through and journaled within a sleeve 46. Joined to the inner end of rod 44 is a fitting 48 corresponding to fitting 40 discussed in connection with arm 24.

Referring now also to FIGS. 2, 4, and 5, mounted on frame 12 of the paver through bracket structure 50 are a pair of opposed, parallel and facing channel irons 52, 54. These constitute guide structure slidably mounting what is referred to herein as a carriage, indicated generally at 56. Carriage 56 comprises specifically upper and lower bars 58, 60 joined together by plates 62, 64 welded to the bars and extending between them. Aligned bearings 66, 68 mounted approximately centrally of plates 62, 64 journal a shaft 70 having a pinion gear 72 fastened thereto.

Carriage 56 accommodates travel of the pinion gear, bearings and other parts mounted thereon in a direction paralleling the channel irons, or in a lateral direction relative to the paver.

Slidably mounted on each of the bars 58, 60 is a rack, shown for bar 58 at 74 and for bar 60 at 76. These racks may be received within grooves such as grooves 78 provided along the faces of the bars. The racks have teeth meshing with the teeth of pinion gear 72.

As best seen in FIGS. 4 and 5, the end of rack 76 is fastened through a collar 80 and pins 82 to a plate 84, and this plate in turn is welded at 86 to fitting 40 attached to rod 38 and arm 24. Referring to FIG. 1, rack 74 is similarly attached to a plate 88 which is welded to fitting 48 for arm 26. On turning of pinion gear 72 in a clockwise direction in FIG. 1 racks 74, 76 travel away from each other, and the opposed attaching arms separate from each other. Rotation of the pinion gear in the opposite direction is effective to drawn the racks inwardly toward each other, with corresponding movement being produced in attaching arms 24, 26.

The arms are prevented from swinging downwardly to a position lower than that shown in FIG. 1 by a stop bar such as bar 90 (see FIG. 5) illustrated for rod 38 and arm 24, one being provided for each arm. In the case of arm 24, bar 90 is fastened to fitting 40, and the bar strikes the underside of plate 84 to prevent further rotation in a counterclockwise direction in FIG. 5 from the position shown. In this way the arm when unattached from the wheel assembly of a lead vehicle is supported in the air, ready for easy attachment to a wheel assembly when such is made. A similar stop bar (not shown) may be provided for the opposite attaching arm and its fitting on the other side of the paver.

An important part of this invention is the provision of an actuator or actuating means, for actuating the rack and pinion mechanism supported in carriage 56 which produces movement of the arms, which is located adjacent the rear of the paver in a position to be manipulated by an operator stationed on platform 21 at the rear of the paver. In this way an operator may connect or disconnect the paver from a dump truck without leaving his station to come to the front of the paver.

More specifically, extending between forward and rear ends of the hopper, and joined to forward and rear walls 92, 93 thereof, is a hollow tube or pipe 96. This tube houses a shaft 98 journaled within the tube having forward and rear ends 98a and 98b. Rear end 98b of the shaft has a crank handle or actuator 100 connected to it, which may be manipulated to rotate shaft 98. A ratchet 102 fastened to the shaft and a pawl 104 pivotally supported above the ratchet on the rear wall of the hopper provide means for locking the shaft in place.

The forward end of the shaft is connected by a flexible joint designated generally at 106 to shaft 70 described in connection with pinion gear 72. Joint 106 comprises a universal 108 interposed between end 98a of the shaft and a coupling member 110. Coupling member 110 is spline-connected to a shaft 112 received within the coupling member and projecting forwardly therefrom. Shaft 112 is movable longitudinally relative to the coupling member, i.e., is extensible from the coupling member, but is held from relative rotation because of the spline connection between it and the coupling member. The forward end of the shaft is joined to shaft 70 through a universal 114.

With the flexible joint described included in the means interconnecting the actuator and the pinion gear mechanism, a non-traveling actuator or crank handle may be employed for actuating the arms to move them, in combination with pinion gear mechanism for moving the arms which is movable laterally of the paver at the front of the machine. This opportunity for lateral movement in the pinion gear mechanism is important, as it enables relative movement between the paver and the vehicle coupled to it during actual paving of an area, and further facilitates the attaching of a dump truck to the paver without first having exactly to align the truck with the paver.

From the above description it will be apparent that elongated, extensible-contractible means is provided which extends between and interconnects the rear end portions of arms 24, 26, more specifically rods 38, 44 which form part of these arms. Referring to FIG. 1, such extensible-contractible means comprises, in the embodiment of the invention illustrated, fitting 48, plate 88, the rack and pinion mechanism including racks 74, 76, and fitting 40. The rack and pinion mechanism, comprising racks 74, 76, the pinion gear which engages these racks, and the carriage which journals the pinion gear and slidably supports the racks, constitutes in the embodiment of the invention illustrated a mechanically operated mechanism which is actuatable to produce extension and contraction of the elongated extensible-contractible means interconnecting arms 24, 26. Guide means mounted on the trailing vehicle or paver mounts the arms and extensible-contractible means, accommodating movement of the arms and extensible-contractible means as a unit lateraly of the trailing vehicle or paver, and in the particular embodiment of the invention illustrated, such guide means comprises sleeves 36, 46 (which mount the arms) and channel irons 52, 54 (which slidably mount carriage 56). The pinion gear constitutes a part which is rotated to produce extension and contraction of the extensible-contractible means, and the axis of rotation of this pinion gear may extend at an angle relative to the axis or rotation of shaft 98 which is rotated to rotate the gear, by reason of the inclusion of the universal described. Movement of the pinion gear laterally of the paver while maintaining a driving connection between shaft 98 and the pinion gear is made possible by the inclusion of coupling member 110 which is spline connected to shaft 112.

Describing the operation of the apparatus, prior to attaching the paver to a dump truck, arms 24, 26 are spread apart from each other the maximum distance afforded by the structure mounting the arms. This may be done by first lifting pawl 104 free of ratchet 102, and the turning the crank handle in a direction whereby the racks connected to the arms move away from each other. With the arms widely spread apart, a dump truck may be backed toward the paver, with its rear wheel assemblies between the arms. The crank handle may then be rotated in the opposite direction, and such rotation is transmitted to shaft 70 and the pinion by shaft 98 and the other power-transmitting means described, causing the racks to move toward each other and corresponding movement in the arms.

If one arm, and let it be assumed that it is arm 24, should contact the side of a tire casing on one side of the truck before the other arm does, after such contact is made and on further rotation of the crank handle, carriage 56 travels toward the arm that has made contact, i.e., arm 24, to enable the opposite arm to continue to move inwardly. In this way turning of the actuator or handle may be continued until both arms have made contact with tire casings on opposite sides of the truck. When such occurs the arms are in proper position for coupling the paver to the truck, and pawl 104 by engaging the teeth of ratchet 102 prevents lateral outward movement of the arms and decoupling of the paver from the truck.

The operator by noting the resistance offered to turning the crank handle may "feel" when the arms are in proper position. Throughout the entire coupling operation, he may remain stationed to the rear of the hopper in the paver.

To decouple the paver from the dump truck, the pawl is released from the ratchet, and the arms are free to be spread apart from each other.

It should be obvious from the above that the construction contemplated has a number of novel features contributing to convenience and ease of operation. While an embodiment of the invention has been described, changes and variations are possible without departing from the invention. It is desired to cover all modifications and variations that would be apparent to one skilled in the art, and that come within the scope of the appended claims.

It is claimed and desired to secure by Letters Patent:

1. Apparatus for attaching trailing and lead vehicles where the lead vehicle is supported by rear wheel assemblies comprising a pair of attaching arms disposed adjacent opposite sides of the trailing vehicle, said arms having rear ends adjacent the trailing vehicle and forward ends projecting forwardly of the trailing vehicle, said forward ends having wheel engaging means for engaging the rear wheel assemblies of the lead vehicle, elongated, extensible-contractible means extending transversely of the trailing vehicle, with opposite ends of said extensible-contractible means connected to said rear ends of said arms, said extensible-contractible means including mechanically operated mechanism actuatable to extend or to contract the means with such producing relative movement of the arms toward and away from each other, guide means mounted on the trailing vehicle mounting said extensible-contractible means and arms, and accommodating movement of the extensible-contractible means and arms as a unit laterally of the trailing vehicle, actuating means for actuating said mechanism mounted on the trailing vehicle, and means connecting the actuating means and mechanically operated mechanism of the extensible-contractible means whereby operation of the actuating means produces operation of the mechanically operated mechanism, said connecting means including a flexible joint accommodating relative movement of the extensible-contractible means in a direction extending laterally of the trailing vehicle.

2. The apparatus of claim 1, wherein said mechanically operated mechanism which is actuatable to produce extension and contraction of the extensible-contractible means comprises a rack for each of the arms, a pinion gear engaging the racks for the arms which is rotatable to produce movement of the racks toward and away from each other, and a carriage journaling the pinion gear and having the racks mounted thereon with movement afforded the racks relative to the carriage.

3. The apparatus of claim 1, wherein said actuating means comprises a shaft rotatably mounted on the trailing vehicle, said mechanically operated mechanism includes a rotatable part which is rotated to produce extension and contraction of the extensible-contractible means, and a said flexible joint in the means connecting said actuating means with the mechanically operated mechanism includes a universal connecting said shaft and said rotatable part accommodating rotating of said part with the axis of the shaft disposed at an angle relative to the rotation axis of said part.

4. The apparatus of claim 1, wherein said trailing vehicle comprises a paver including a hopper for holding paving material, the mechanically operated mechanism is located forwardly on the paver from said hopper, the actuating means comprises an elongated shaft with its forward end adjacent said mechanically operated mechanism, said shaft extends rearwardly through said hopper, and said connecting means comprises means connecting the forward end of the shaft with said mechanically operated mechanism.

5. The apparatus of claim 4, wherein a tube is provided which extends through the hopper between forward and rear portions thereof, and said shaft is rotatably mounted within and extends through the tube, and said actuating means further comprises a turn handle joined to said shaft disposed to the rear of the hopper.

6. The apparatus of claim 4, wherein said mechanically operated mechanism comprises a rack connected to each of the arms, a pinion gear engaging the racks for the arms, and a carriage journaling the pinion gear having the racks mounted thereon with movement afforded the racks relative to the carriage.

References Cited by the Examiner

UNITED STATES PATENTS

| | | | |
|---|---|---|---|
| 2,287,955 | 6/1942 | Zunino. | |
| 2,800,340 | 7/1957 | Standfuss. | |
| 2,846,018 | 8/1958 | Puckett. | |
| 3,109,352 | 11/1963 | Mack | 94—44 X |
| 3,138,392 | 6/1964 | Holland | 280—447 |
| 3,172,694 | 3/1965 | Bradley | 294—86 |
| 3,199,910 | 8/1965 | Bradley | 294—86 |

JACOB L. NACKENOFF, *Primary Examiner.*